Figures 1, 7:
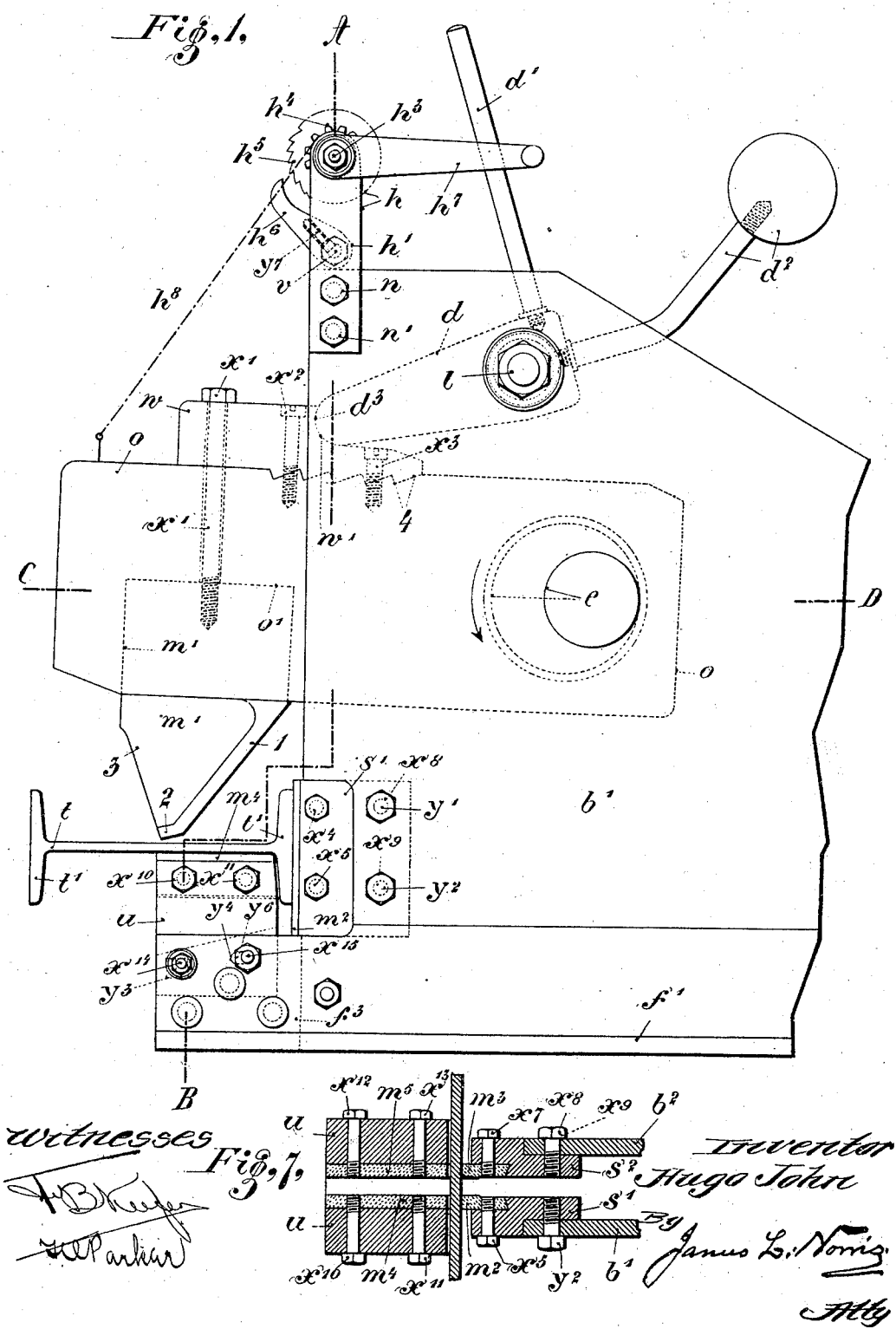

No. 683,289. Patented Sept. 24, 1901.
H. JOHN.
MACHINE FOR CUTTING OR DIVIDING GIRDERS, ANGLE IRONS, &c.
(Application filed Mar. 22, 1901.)
(No Model.) 4 Sheets—Sheet 1.

Witnesses
Inventor
Hugo John
By James L. Norris
Atty

No. 683,289. Patented Sept. 24, 1901.
H. JOHN.
MACHINE FOR CUTTING OR DIVIDING GIRDERS, ANGLE IRONS, &c.
(Application filed Mar. 22, 1901.)
(No Model.) 4 Sheets—Sheet 2.
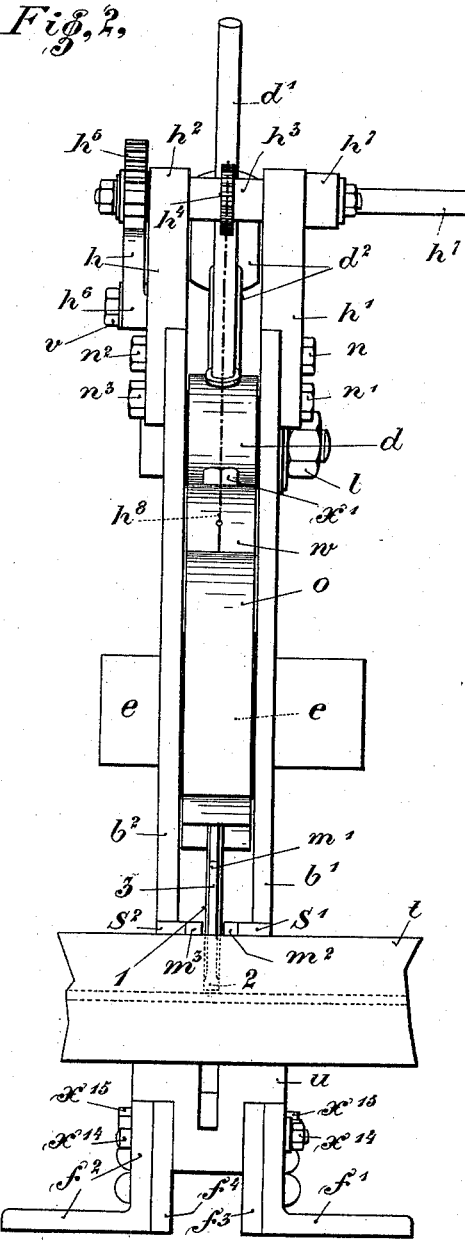
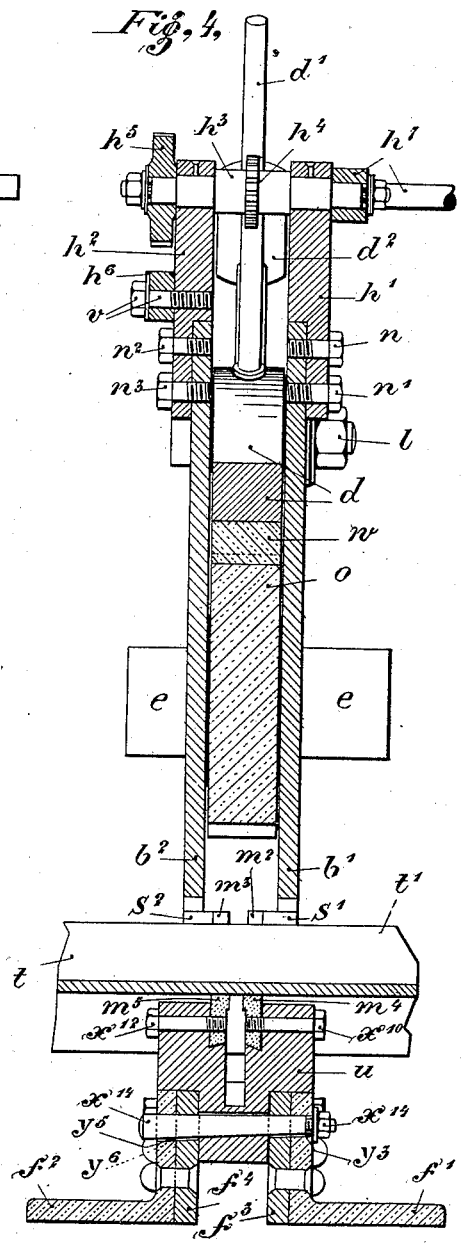
Witnesses:
Inventor
Hugo John
By James L. Norris
Atty No. 683,289. Patented Sept. 24, 1901.
H. JOHN.
MACHINE FOR CUTTING OR DIVIDING GIRDERS, ANGLE IRONS, &c.
(Application filed Mar. 22, 1901.)
(No Model.) 4 Sheets—Sheet 3.
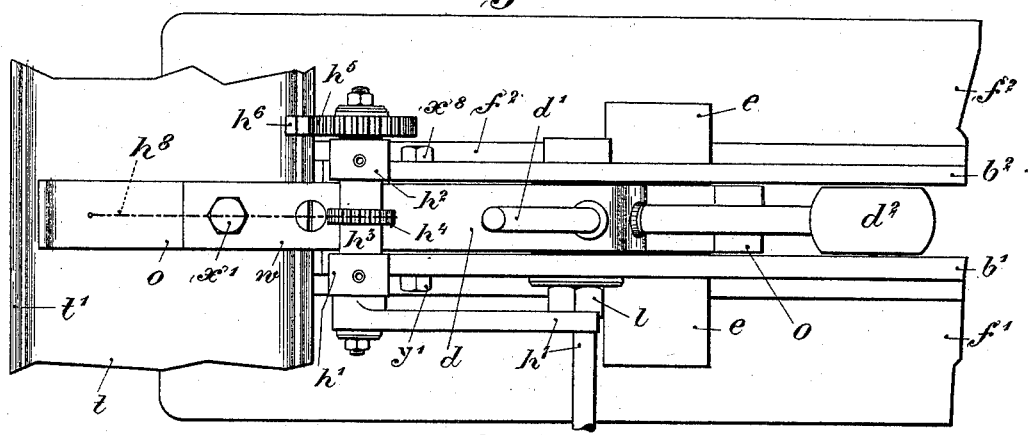
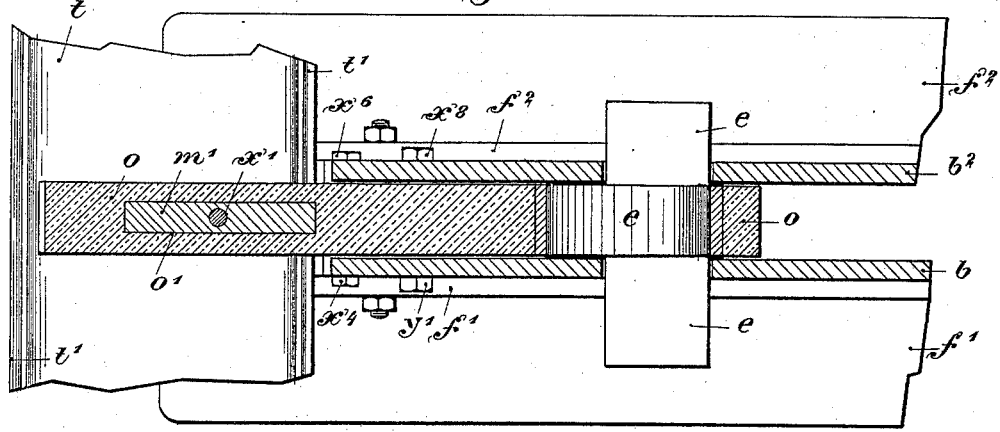
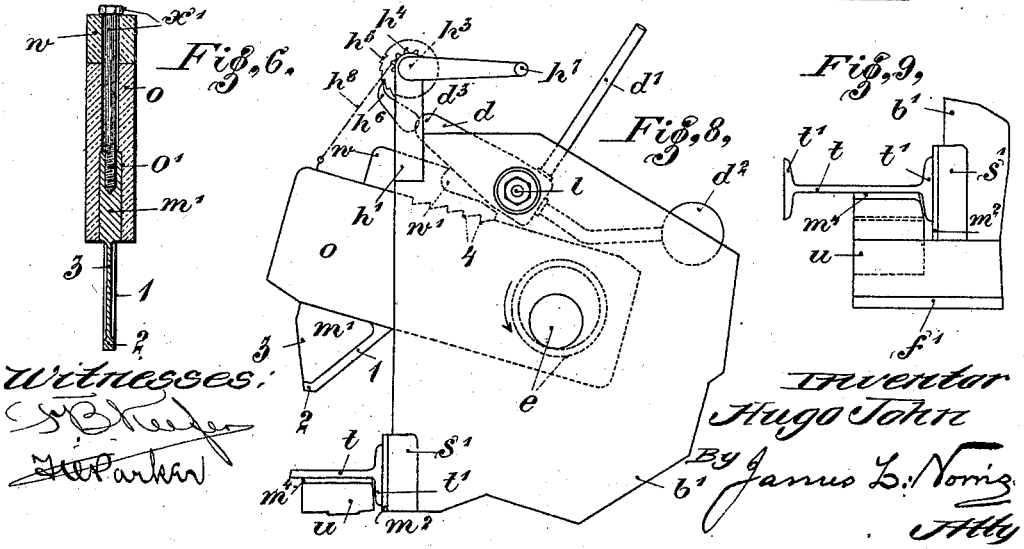
Witnesses:
Inventor
Hugo John
By James L. Norris
Atty

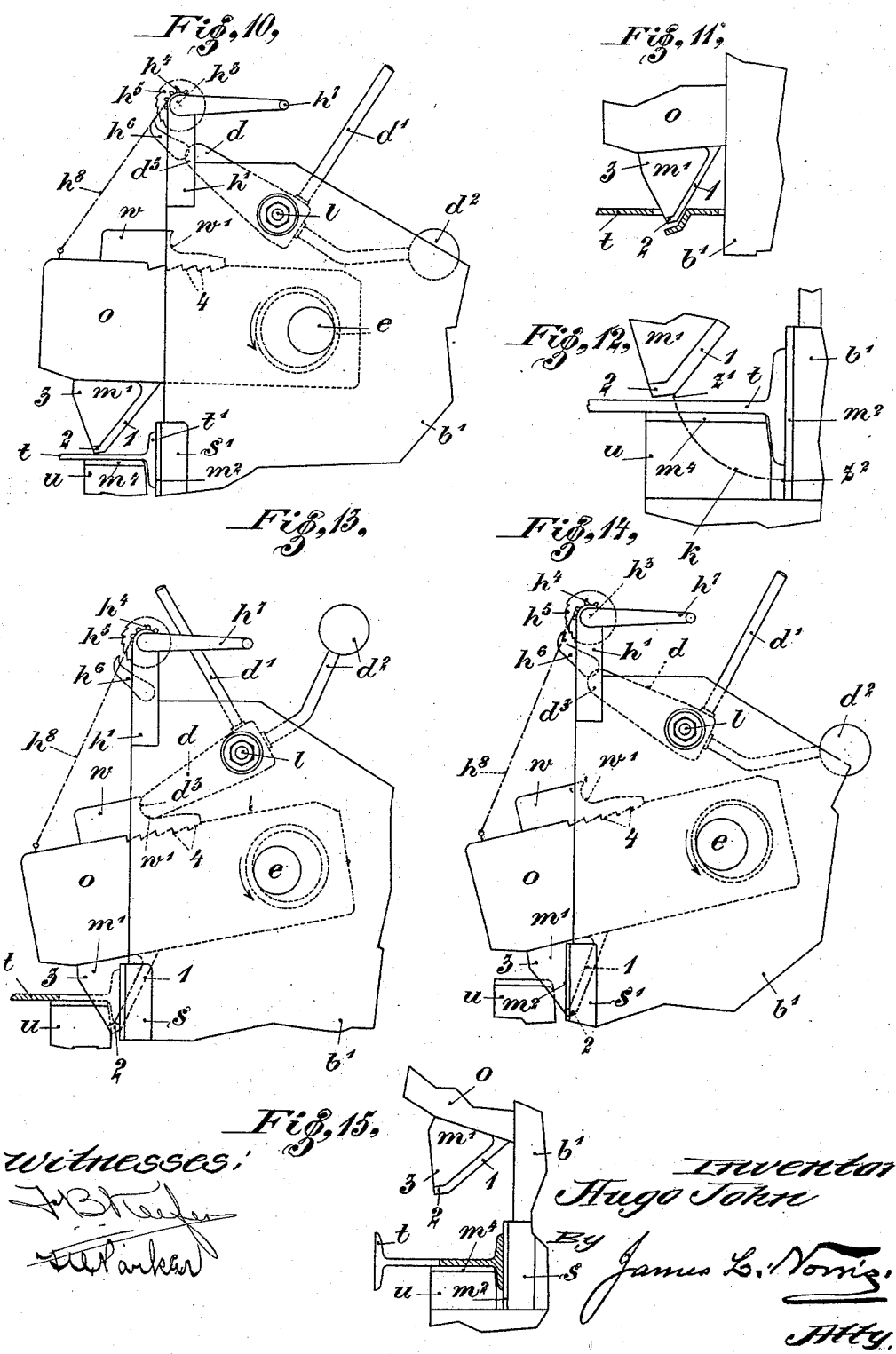

UNITED STATES PATENT OFFICE.

HUGO JOHN, OF ERFURT, GERMANY.

MACHINE FOR CUTTING OR DIVIDING GIRDERS, ANGLE-IRONS, &c.

SPECIFICATION forming part of Letters Patent No. 683,289, dated September 24, 1901.

Application filed March 22, 1901. Serial No. 52,429. (No model.)

*To all whom it may concern:*

Be it known that I, HUGO JOHN, manufacturer, a subject of the King of Prussia, Emperor of Germany, residing at Erfurt, in the Kingdom of Prussia and German Empire, have invented certain new and useful Improvements in Machines for Cutting or Dividing Girders, Angle-Irons, and the Like, of which the following is a specification.

My invention refers to a machine for dividing profiled iron bars, such as double-T girders, Z, T, U, and like angle-irons, the new and special feature of which is that the girder or bar first receives a double "drawing" punch cut and then a double drawing shearing cut, the girder or iron being placed between two stationary cutter-holders provided with vertically and horizontally fixed cutter-surfaces, between which the upper cutter passes in a curved path, the result of the coöperation of the various cutters being a strip or band of the width of the upper cutter's cutting-face cut out of the girder or iron by the upper cutter, which first makes a cut or hole in the material and then a drawing or shearing cut.

The present machine is provided with an arrangement according to which the upper cutter, which effects the drawing punching and shearing cuts, becomes automatically uncoupled after the cut is completed.

The preferred form of machine is represented in the accompanying drawings, of which—

Figure 1 is a side view of the machine; Fig. 2, a front view; Fig. 3, a plan view; Fig. 4, a vertical section on the line A B of Fig. 1; Fig. 5, a horizontal section on the line C D of Fig. 1; Fig. 6, a vertical section through the upper cutter; Fig. 7, a horizontal section through the under cutters and lateral cutter, while Figs. 8 to 15 represent the movement of the upper cutter, illustrating the various phases of the work and the process of the cutting.

The machine is arranged as follows: The body consists of two metal side plates $b'$ $b^2$, to the lower end of which are secured angle-bars $f'$ $f^2$. The plates $b'$ $b^2$ are connected with each other and held at certain distances apart by means of suitable distance-bolts, and in the space thus formed between them the various parts of which the working mechanism is composed are arranged. The shaft $e$ of an eccentric is supported, in the known manner, in bearings arranged in the said plates $b'$ $b^2$ and is driven by hand or power. The eccentric $e$ actuates the holder $o$ of the upper cutter. In a suitable recess or slotted opening $o'$ of the holder $o$ is placed the upper cutter $m'$, the triangular part of which projects downward and is provided with two cutting edges 1 and 2. The part 3 behind the cutting edges is somewhat narrower than the latter, so as to avoid unnecessary friction as well as for the purpose of allowing easier cutting and withdrawal of the cutter from the work.

The upper cutter $m'$ is fixed in position by means of a screw $x'$. On the back of the holder $o$ of the upper cutter is attached a counter-bearing $w$, with a rounded counter-surface $w'$. This bearing is rigidly held in position by means of interlocking parts or teeth 4 and screws $x^2$ and $x^3$. Two stationary vertical holders $s'$ and $s^2$ are provided at the front portion of the machine, being partly let into the metal plates $b'$ and $b^2$ and partly projecting from them. To these holders the lateral cutters or cutter-surfaces $m^2$ and $m^3$ are fixed, the distance between them being so calculated that the upper cutter $m'$ may just pass between them without touching them. These lateral cutters $m^2$ and $m^3$ are fixed to the corresponding holders $s'$ and $s^2$ by bolts $x^4$ $x^5$ $x^6$ $x^7$, while the holders $s'$ and $s^2$ of these knives in their turn are fixed to the metal plates $b'$ and $b^2$ of the machine by bolts $y'$ and $y^2$ and $x^8$ $x^9$, the distance apart of these holders being somewhat greater than that of the cutters fixed on them, so as to enable the strip of material resulting from the cut to fall through.

On the projections of the angle-bars $f'$ $f^2$, projecting in front of the machine and strengthened by plate $f^3$ $f^4$, secured to them, is carried the horizontal holder $u$ of the under cutter, the said holder, although stationary during the act of cutting, being displaceable within the narrow limits within which its position can be regulated according to requirements. The said holder $u$ carries two under cutters $m^4$ $m^5$, the space between which is so calculated that the upper cutter may just pass between them without friction. The said under cutters are fixed to the holder $u$ by bolts $x^{10}$ $x^{11}$ $x^{12}$ $x^{13}$, while the holder is fixed in the position, regulated according to requirements, by means of through-bolts $x^{14}$ $x^{15}$, the shaft of the bolt $x^{14}$ being preferably conical and of square cross-section.

In order to allow the displacement of the holder of the under cutter, the shafts of the two bolts $x^{14}$ and $x^{15}$ are arranged in elongated holes or slots $y^3$ $y^4$ $y^5$ $y^6$. The holder $o$ of the upper cutter is not only constantly actuated by the eccentric $e$, but also by a pressure device $d$, which, however, acts only intermittently during those phases of the work when such pressure is required. This device controls the manner of movement whenever it is coupled, as represented in Fig. 1, thereby guiding, as it were, the upper cutter in its work. I will therefore call this pressure device a "guide" in the course of this specification.

The guide $d$ oscillates around a spindle $l$ and is provided with a handle $d'$ and a counter-weight $d^2$, and is provided at its free end with a suitable rounded surface $d^3$, adapted to engage during the work of cutting in a corresponding recessed counter-surface $w'$ on the counter-bearing $w$. The movable holder $o$ of the upper cutter is also under the intermittent control of a lifting and interlocking mechanism $h$, arranged on the forward portion on the back of the machine. This device consists of two uprights $h'$ $h^2$, fastened to the side plates $b'$ and $b^2$ by bolts $n'$ $n^2$ $n^3$ and having a shaft $h'''$, on which are keyed a chain-wheel $h^4$ and a ratchet-wheel $h^5$, combined with a pawl $h^6$, the pawl being mounted on a spindle $v$, secured to one of the uprights $h^2$, while the pawl $h^6$ is controlled by a spring $y^7$, which tends to keep it coupled to the ratchet-wheel. The chain-wheel $h^4$ can be turned in any direction by a crank $h^7$. The chain-wheel $h^4$ is provided with a chain $h^8$, the other end of which passes through a hook suitably arranged on the holder $o$ of the upper cutter. It is clear from the above that the upper cutter can be raised or lowered at will by correspondingly turning the crank, if care is taken to disengage the pawl $h^6$ from the ratchet-wheel $h^5$ when lowering the holder.

The working of the machine is as follows: The holder $o$ of the upper cutter occupies its uppermost position, Fig. 8, in which it is held by the chain $h^8$ of the lifting and locking mechanism $h$, the pawl $h^6$ being engaged with the corresponding ratchet-wheel $h^5$. In this position the holder will be merely reciprocated by the movement of the eccentric $e$ without, however, producing any working effect. The iron to be divided—a girder, for instance—is placed on the under cutters, as represented in Fig. 9, in such a manner that a flange $t'$ lies between the holder $u$ of the under cutter and the lateral cutters $m^2$ $m^3$, with as little free space between them as possible. For this purpose the holder $u$ of the under cutter is first regulated before the actual cutting begins, according to the approximate thickness of the flange. In Fig. 9 the extreme limit forward position of the holder of the under cutter is represented, being the position required for a girder of the maximum dimensions which may be thus cut on this machine. In the case of lesser dimensions or sections the holder of the under cutter is correspondingly placed nearer to the body of the machine. Next the handle of the crank $h^7$ is seized by one hand and slightly turned forward, in consequence of which the pawl $h^6$ becomes disengaged from the ratchet-wheel $h^5$, and by turning the crank $h^7$ in the opposite direction the holder $o$ of the upper cutter is lowered until the cutting edge 2 comes close to the bar to be cut, as represented in Fig. 10. This position represents the limit position immediately before the cutting takes place, and it is easy to ascertain then one's self whether the bar occupies the correct position for cutting, owing to the continuous reciprocating movement of the holder $o$ of the upper cutter, and should this not be the case to adjust the girder according to requirements, during which time the holder may be raised and fixed in its raised position, if required, by means of the crank. This point, however, is not absolutely necessary, since the upper cutter would only reciprocate on the girder to be cut without, however, as yet producing any cutting effect. The crank $h^7$ of the lifting device $h$ is then liberated again in case the holder of the upper cutter had been raised again. The holder of the upper cutter being no longer controlled by the lifting device $h$ descends until the cutting edge 2 comes in contact with the girder to be cut. The handle $d'$ of the guide or pressure device $d$ is now taken hold of and by drawing it forward is brought in such a position that the rounded surface $d^3$ comes in contact with the counter-surface $w'$ of the counter-bearing $w$. In this manner the holder of the upper cutter is subjected to a double effect—namely, to the effect of the eccentric $e$ rotating in the direction indicated by the arrow—which effect tends to move the holder toward and from the body of the machine, and to the effect of the guide or pressure device $d$, which acts against the holder $o$ of the upper cutter in the manner of a bell-crank lever rotatorily arranged on the bolt $l$, which effect forces the holder $o$ to partake of a downward movement during the movement inward produced by the eccentric. The cutter $m'$ participates in this movement of its holder $o$ and first punches the iron with the point 2, producing a hole in the latter of dimensions corresponding to the four edges limiting the cutting-face 2, Fig. 11, and then moves in the direction of the curve $k$, Fig. 12, between the points $z'$ and $z^2$ of that curve, cutting on its way as it passes through the position indicating the lowest limit, Fig. 13, the material standing in its way with a double shearing cut and throwing the band or strip thus cut out from the girder out of the machine from between the two holders of the lateral cutters. This double shearing cut having been completed the upper cutter $m'$ meets no more resistance and the holder $o$ of the upper cutter descends by its own weight as far as the chain $h^8$, which has been regulated to that effect, will permit. When the holder $o$ thus reaches its lowest position, Fig. 14, the guide or pressure device $d$ no longer acts on its counter-bearing $w$, and the connection between it and the holder $o$ of the upper cutter, which has been caused by the resistance of the material to be cut, no longer exists, and the guide is thereupon turned upward by its counterweight $d^2$, thus moving from its lowest position, Fig. 13, to its uppermost limit, Fig. 14, where it remains until required for the next cut. At this point of the operation the pawl $h^6$ is caused again to engage with the ratchet-wheel, after which the holder of the upper cutter is raised to its uppermost limit, Fig. 8, by turning the crank in the corresponding direction, after which the T-girder is rearranged for the purpose of the second and last cut, during which operation the upper cutter $m'$ is raised out of the way, Fig. 15. This rearrangement of the girder is necessary in case of all irons or girders of I, U, and Z section, while those of an L and T section are divided by a single cutting operation.

Bars or girders of considerable height are cut by means of large undercutters with correspondingly-large holders, the cutters being long, as represented in Fig. 1, while sections of less dimensions are cut by corresponding tools. The lateral cutters remain the same for all sections. With a machine as described above a great number of bars of different sections may be cut without changing the cutters, since it is not a question as to how much of the material is cut off from the girders to be divided during the first cut and how much during the second. Thus, for instance, the whole of the web and one flange of a small I-girder may be cut by the first cut, while only the second flange remains to be cut by the second.

The work of cutting is effected during the time the upper cutter $m'$ passes from the point $z'$ to the point $z^2$ of the curve $k$, Fig. 12. This cutting work consists of a punching action, since the cutter enters the web of the girder obliquely, thus acting as a punch moving obliquely, and of a shearing or sawing action with a drawing cut, since the punching action is immediately followed by a drawing action by which the material is cut out of the girder. In consequence of this nature of the cutter girders can be divided at a greatly-lessened expenditure of power, while the surfaces of the cuts are clean and smooth.

Having now particularly described and ascertained the nature of my said invention and in what manner the same is to be performed, I declare that what I claim is—

1. In a machine for cutting or dividing girders, angle or section irons and the like, lateral cutters for the material, under cutters for supporting the material, upper cutters for the material, a holder for the upper cutters, a lifting device for the holder, means for connecting the lifting device to the holder for elevating the latter, and means connected with the lifting device for retaining the holder in an elevated position.

2. In a machine for cutting or dividing girders, angle or section irons and the like, a holder, an upper cutter carried by said holder, a pressure device engaging with said holder for retaining the upper cutter in engagement with the material during the cutting operation, a pair of under cutters upon which the material to be cut is mounted, a pair of lateral cutters adapted to engage the material, and means for reciprocating said holder and in connection with said pressure device adapted to impart a drawing punching and a drawing shearing cut to said upper cutter.

3. In a machine for cutting or dividing girders, angle or section irons and the like, a holder, a counter-bearing mounted thereon, an upper cutter carried by the holder, a pressure device engaging said counter-bearing, a pair of adjustable under cutters upon which the material to be cut is mounted, a pair of lateral cutters adapted to engage the material, and means for reciprocating said holder and in connection with the pressure device adapted to impart a drawing punching and a drawing shearing cut to the upper cutter.

4. In a machine for cutting or dividing girders, angle or section irons or the like, a holder, an upper cutter connected to said holder, a pivoted pressure device engaging with the holder, under and lateral cutters, operating means for said holder for imparting a drawing punching and a drawing shearing cut to said upper cutter, and means for elevating and lowering said holder.

5. In a machine for cutting or dividing girders, angle or section irons and the like, a pair of side plates, a holder operating between them, an upper cutter carried by said holder, a pair of adjustable under cutters connected with said plates for supporting the material to be operated upon, a pair of lateral cutters connected with said plates, and operating means for said holder.

6. In a machine for cutting or dividing girders, angle or section irons and the like, a pair of side plates, a holder operating between them, an upper cutter connected thereto, a pressure device engaging with said holder, a pair of adjustable under cutters connected with said plates for supporting the material to be operated upon, a pair of lateral cutters connected with said plates, and operating means for said holder.

7. In a machine for cutting or dividing girders, angle or cutter irons and the like, a pair of side plates, a holder operating between them, an upper cutter connected thereto, a pressure device engaging with said holder, a pair of adjustable under cutters connected with said plates for supporting the material to be operated upon, a pair of lateral cutters connected with said plates, operating means for said holder; and means for elevating and lowering said holder.

8. In a machine for cutting or dividing girders, angle or section irons and the like, a reciprocating upper cutter, operating means therefor, a pressure device for said cutter, means for elevating and lowering said cutter, a pair of adjustable under cutters, and a pair of lateral cutters arranged in suitable relation to said under cutters.

9. In a machine for cutting or dividing girders, angle or section irons and the like, a reciprocating holder, operating means therefor, a cutter secured to said holder and provided with a pair of cutting edges, a pivoted pressure device engaging with said holder, a pair of adjustable under cutters, and a pair of lateral cutters arranged in suitable relation to said under cutters.

10. In a machine for cutting angle-irons and the like, an upper cutter provided with a pair of cutting edges, means for reciprocating said cutter, a pressure device for retaining said cutter during the reciprocation thereof in engagement with the material being cut, means for elevating and lowering said upper cutter, a pair of under cutters for supporting the material to be cut, and a pair of lateral cutters adapted to engage the material during the cutting operation.

11. In a machine of the character described, under cutters for the material, lateral cutters for the material, an upper cutter provided with a pair of cutting edges, a holder connected thereto, means for reciprocating said holder, and a pressure device engaging the holder for retaining the upper cutter in engagement with the material to be cut during the operation of the holder.

In testimony whereof I have hereunto set my hand in presence of two subscribing witnesses.

HUGO JOHN.

Witnesses:
WILHELM BINDEWALD,
CARL SCHREIBER.